Dec. 8, 1959   J. A. VEALEY   2,915,891
RING FASTENER
Filed Jan. 14, 1955
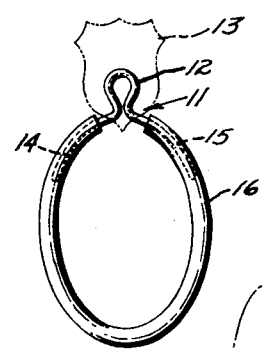
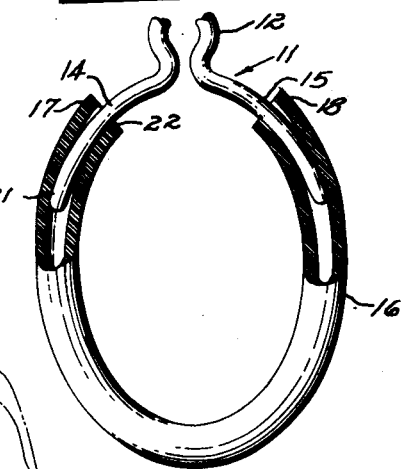
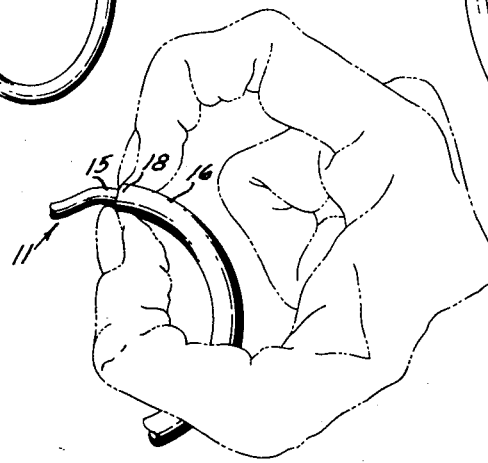
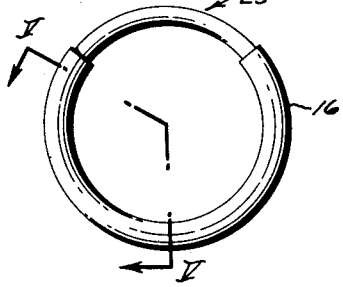
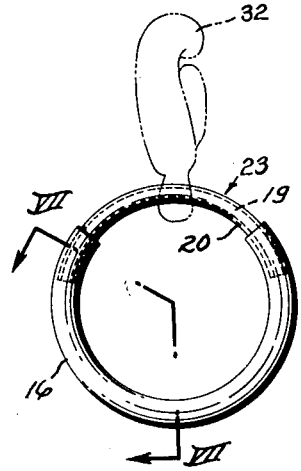
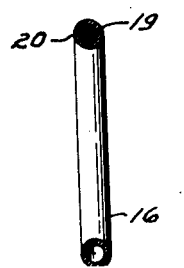
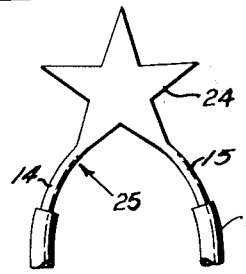
INVENTOR
JACK A. VEALEY
BY
ATTORNEYS

United States Patent Office 2,915,891
Patented Dec. 8, 1959

2,915,891

RING FASTENER

Jack A. Vealey, Lansing, Mich.

Application January 14, 1955, Serial No. 481,887

5 Claims. (Cl. 70—459)

The present invention relates to a new and novel fastener and is more particularly directed to a new and novel substantially closed ring-like fastener which is secure when tensionally stressed.

Known ring fasteners have generally utilized relatively complicated spring biased levers and rotating ring structures to secure closure of the ring. These fasteners have a common disadvantage in that they normally depend on the spring-like nature of the materials of construction to effect and insure closure. These materials weaken or fatigue under usage and allow the fastener to open accidentally. Further, the mechanical complexity of such retainers makes them relatively expensive to manufacture and assemble.

Therefore, one of the objects of the present invention is to provide a substantially ring-like fastener which will not open under tension or pressure normal to the ring or objects secured thereby.

A further object of the present invention is to provide a fastener which is easily opened without exercise of extreme pressures, operation of intricate mechanisms or depression of springs or clasps.

Another object of the present invention is to provide a fastener which is capable of varied uses such as in key rings, shower curtain rings, baggage tag rings, and the like.

A still further object of the present invention is to provide a fastener which is adaptable to numerous aesthetic designs.

Still another object of the present invention is to provide a fastener which is easy to fabricate, simple to operate and which is strong, durable and secure.

These and other objects will become apparent to those skilled in the art as the description proceeds.

Referring to the drawings:

Figure 1 shows a front elevation of the fastener of the present invention with a fob in phantom line.

Figure 2 shows in partial cutaway section the arcuate arms and tubular ring member.

Figure 3 shows in phantom line the method of removing the tubular ended ring member from the yoke.

Figure 4 shows a modification of the yoke and ring member where the yoke is merely an arcuate extension of the arcuate arms.

Figure 5 is a sectional elevation through line V—V of Figure 4 showing the rod-like character of the yoke and the tubular character of the ring member.

Figure 6 shows another modification of the yoke and ring member with a fob in phantom line and showing a yoke member having a metal core.

Figure 7 is a sectional elevation through line VII—VII on Figure 6 showing the metal core and plastic sheath as viewed through one of the arms.

Figure 8 shows an elevation view wherein the yoke and fob are integral.

It will be seen that the present invention provides a tensionally secure fastener of substantially circular shape which is easily fabricated, economically produced and has high usefulness and salability in its various forms.

*General description*

The preferred embodiment of the fastener of the present invention comprises a yoke member having substantially arcuate arms integral therewith and extending therefrom; a substantially tubular ring member which slides over the arms and which tubular member, together with the yoke and arms, forms a substantially circular closed tensionally secure fastener. A fob having aesthetic or ornamental qualities may be attached to the yoke member as shown in phantom line in Figure 1. Fobs such as shown in Figures 6 and 8 are illustrated as other modifications.

Utilizing a tube of resilient material into which has been inserted a relatively inflexible rod material the application of tensioning stresses as between rod and tube causes a resilient deformation of the tube along longitudinal lines, tending to diminish the diameter of the tube where it engages the rod. The added factor of friction, in contacting surfaces of the rod and/or the tube, enhances this action by resisting movement initially until the diameter reducing action of the tube causes positive gripping.

When this gripping action is combined with the cocking action (Figure 2) on the tubular material where it frictionally engages the relatively stiff arcuate arms of the rod material, it is readily appreciated that unusual tightness of grip occurs between rod and tube when the ring-like fastener is tensionally stressed.

Many modifications of the present invention can be made, one of which is shown in Figure 4 wherein the yoke member is merely an arcuate rod-like extension between the pairs of extending arms. Various novel fob arrangements are adaptable to this modification, one of which is shown in Figure 6.

*Specific description*

Referring with more particularity to the drawings: In Figure 1, a yoke member 11 is provided comprising a central substantially open circular inverted U-shaped portion 12; an integral medallion-like extension or fob 13 thereon and preferably in planal relation thereto (shown in phantom line); and a pair of downwardly depending generally arcuate arms 14 and 15. The arcuate arms 14 and 15 are preferably made of round stock. The yoke 11 is also preferably made of round stock and may take the general shape described above or such shape, for example, as shown in the drawings in Figures 6 and 8. However, in various other embodiments, square, hexagonal and even triangular stock has been satisfactorily used for both the yoke 11 and its arcuate arms 14 and 15. In modifications as shown in Figures 4 and 6, the yoke portion 23 becomes merely an arcuate extension of the arms 14 and 15.

A tubular member 16 formed of a flexible material which has a pliability or flexibility greater than that of the yoke member 11 and its arms 14 and 15 is provided. The tubular member 16 has ends 17 and 18 which slide over the arms 14 and 15 of yoke member 11. While the tubular member 16 is preferably tubular throughout, it may be tubular at its ends only. It is to be understood that its external shape insofar as it does not markedly increase its rigidity, and does not take away at least the tubular end portion, may be of any shape from which its material of construction can be fabricated, for example, hexagonal, triangular, square or polyangular.

Various modifications can be made in the design of the invention without departing from the spirit or scope thereof. Several of the more ideal modifications of the present invention are represented in Figures 4, 6, and 8.

While the design of the yoke member 11 is shown as a substantially U-shaped member, it can be of a form shown in Figures 4 and 6. That is, the yoke member 23 may be of a general rod-like arcuate shape throughout, or it may be merely the fob having generally arcuate depending arm extensions 14 and 15 as shown in Figure 8.

Further modification in the design of the yoke 11 may be made in that the extending arms 14 and 15 may be in any planal relationship with the yoke member 11. That is to say the yoke member 11 may be in a relation of 90 degrees planally with said arms 14 and 15. The arms themselves at least at the end portions can be disposed in diverging relation to each other to facilitate in a gripping action as disclosed below.

The yoke member 11 and in particular the arms 14 and 15 are preferably made of round rod stock, but may take the shapes described hereinbefore. In the preferred embodiment, the yoke 11 and arms 14 and 15 are made of plastic. However, metal or metal coated with plastic is satisfactory yoke material and is illustrated in Figures 6 and 7. In Figures 6 and 7, the arms comprise a metal core 19 and plastic sheath 20 providing unusually good, frictional engagement with the ends 17 and 18 of the tubular member 16. The essential feature of the yoke and arm material is that it be more rigid than the tubular ring material. Some advantage is noted where the contact surfaces of arms 14 and 15 and the tubular ends 17 and 18 of the ring material are upset for enhancing frictional grip.

The ring material may be made of plastics having a lesser degree of rigidity and a greater degree of elasticity than the yoke material and must be made of a stretchable material. The ring material may be tubular or substantially solid with only the end portions tubular. In external cross section, it may be round, square, triangular, hexagonal or octagonal in exterior shape and may be of like or different internal shape. The rod material forming the arms 14 and 15 should conform in cross section with the internal tubular shape.

The fob 13 may be a separate member secured in a well-known manner to the yoke 11 such as by gluing, integral molding, et cetera (Figure 1) or may be integral therewith as designated by numeral 24 (Figure 8) and of the same material as the yoke 25. As shown in Figure 6, the fob 32 may be slidably positioned having sliding clearance relationship on a generally arcuate yoke 23 and thereby assist in removing the ring member 16 from the yoke 23 by exerting a directional pressure against the end of the tube 17 or 18 similar to that of the nails as shown in Figure 3. Such removing pressure should always coincide with the arcuate curve of the arms 14 and 15.

It will thus be seen that a tensionally secure fastener has been provided which is easily operated, yet will retain its closure even under severe tension on the tubular ended ring-like member 16. Further, a fastener has been provided which is economical to manufacture and assemble and which can be adapted to varied uses. The fastener has, with a fob 13 attached to the yoke member 11, aesthetic adaptability, high salability, and public appeal.

Operation

Referring to Figure 3, the method of operation of the fastener of the present invention is clearly shown. With the tubular member 16 in a closed position, the index finger (shown in phantom line) and the thumb (also shown in phantom line), are placed at the end 18 of tubular member 16. The nails of the finger and thumb are placed so as to grip the end 18 of tubular member 16. Force is exerted along the extent of the arcuate arm 15 following its arcuate shape thereby easily removing tubular member 16 from arm 15.

Closure of tubular member 16 over the arms 14 or 15 to form a closed ring is easily accomplished by sliding the end 17 or 18 of tubular member 16 onto and over arcuate arms 14 or 15, following the arcuate shape of said arms. The fit as between arms 14 and 15 and the tubular ring member 16 should be snug, but sufficiently free to permit easy forcing of the arms 14 and 15 into the tube ends 17 and 18.

When the ring member 16 is in a closed position as shown in Figure 4 (for example) normal tension exerted at any point along the circumference of tubular member 16 remote from the arms will not cause the ring member 16 to slide off arcuate arms. The effect of tension along the circumference of ring member 16 is clearly shown in Figure 2 at 21 and 22. It will be seen that a frictional engagement results from the force so applied. A digging or gripping action shown at 21 and 22 is due primarily to the differences in flexibility and pliability of the two materials of construction, the yoke 11 and tube 16, respectively, and the arcuate shape of the yoke arm members 14 and 15. Additional digging action is effected when the end portions of the arms 14 and 15 overlapped by the tube ends in addition to being arcuate are disposed in diverging relation to each other. Additional gripping action occurs when the tubular ring member 16 is stressed at the points of connection tending to diminish the diameter of the tube 16 at those points or at the points of overlap to bind on said arms as it elongates.

Having thus described my invention it will be understood that certain other modifications within the skill of the art are intended to be included within the scope of the invention unless negatived by the scope of the hereinafter appended claims.

I claim:

1. A fastener including: a yoke member having substantially rigid arcuate arms extending therefrom and a relatively resilient ring member of stretchable material slidably engageable over the ends of said arms, said ring member being tubular at least at the ends thereof and adapted to diminish in diameter as it is elongated in use to bind on said arms.

2. A fastener including: a substantially circular U-shaped yoke member having substantially rigid arms integral therewith and extending therefrom in substantially arcuate form; and a relatively resilient circular open ring member of stretchable material having end portions matingly engageable over said arcuate arms defining therewith a closed substantially circular shape and adapted to diminish in diameter as it is elongated in use to bind on said arms.

3. A fastener as claimed in claim 1, wherein said yoke member is substantially arcuate, and further including a fob member in sliding clearance relationship on said yoke member to displace said ring member from said yoke member.

4. A fastener as claimed in claim 1, said yoke member further including a fob integral therewith, said arcuate arms extending therefrom.

5. A fastener including: a yoke member formed of a relatively rigid rod stock comprising a pair of arcuately extending arms the ends thereof being disposed in diverging relation to each other, and a plastic tubular relatively resilient member of stretchable material having end portions matingly engageable over the ends of said arms forming therewith a closed ring fastener, said tubular member being adapted to diminish in diameter to bind on said arms upon the application of pressure upon the midportion of said plastic tubular member such as to place tension on and elongate the tubular member throughout its length.

References Cited in the file of this patent

UNITED STATES PATENTS

| | | |
|---|---|---|
| 310,301 | Miller | Jan. 6, 1885 |
| 437,279 | Berbecker | Sept. 30, 1890 |
| 499,928 | Oppenheimer | June 20, 1893 |
| 649,026 | Wood | May 8, 1900 |

FOREIGN PATENTS

| | | |
|---|---|---|
| 10,029 | Great Britain | 1903 |